Nov. 24, 1964 S. M. SHELLEY 3,158,368

CARD FEED MECHANISM

Filed July 19, 1962 3 Sheets-Sheet 1

INVENTOR.
STEVEN M. SHELLEY
BY John V. Regan
Attorney

INVENTOR.
STEVEN M. SHELLEY
BY
John V Regan
Attorney

INVENTOR.
STEVEN M. SHELLEY
BY John V. Regan
Attorney

United States Patent Office 3,158,368
Patented Nov. 24, 1964

3,158,368

CARD FEED MECHANISM

Steven M. Shelley, Oaklyn, N.J., assignor to Radio Corporation of America, a corporation of Delaware Filed July 19, 1962, Ser. No. 210,888
13 Claims. (Cl. 271—53)

This invention relates generally to feeder mechanisms and, in particular, to a card feed mechanism for controlling the movement of a record card past a work station in a number of incremental steps.

A statistical record card may be defined as one having M rows and N columns of data storage positions, each data storage position being located at the intersection of a row and column. The record cards generally are fed one at a time to a work station, such as a card punch or reader station, in such a manner that the data storage positions are presented to the punch or reader elements either column-by-column or row-by-row. In the case of a card punch station, for example, a number of punches are aligned in a row transverse to the direction of card movement, there being either M punches or N punches, depending upon whether the cards are fed in column-by-column or row-by-row fashion, respectively. In a reader, on the other hand, photosensitive devices or other pickup transducers are used instead of punches.

The data storage positions of a record card are located precisely with respect to one another. Consequently, it is necessary that a card be punched (or read) precisely at the proper storage positions. One of the problems encountered in a card handling machine is the difficulty of maintaining proper synchronism between the movement of the card through the work station and the operation of the punch or reader elements. More particularly, the problem is one of accurately positioning the card at the work station at the moment selected punches are energized or reader elements are gated or strobed. This problem is especially severe at the high operating speeds of modern-day card handling machines.

One known prior art technique suggested for overcoming this problem is to use a series of pusher-type elements mounted on a reciprocating drive member for pushing the card through the work station in a series of incremental steps. However, it has been found that the reciprocating member introduces undesirable vibrations in the system, especially at high speed. Another prior art machine employs a series of individually retractable stop members spaced along the path of card travel at the output side of the feed station. These stop members, of which there may be eighty in a column-by-column feed, are spaced apart a distance equal to the distance between the center lines of adjacent data storage positions of the card. The stop members generally are gear operated and are undesirably complex and costly. Moreover, there is the possibility of loss of timing among the various stop members.

One object of the present invention is to provide an improved feed mechanism for controlling the movement of a record card or the like in a series of incremental steps.

Another object of the invention is to provide an improved feeder control mechanism which need have only one driven member and in which there is no reciprocating motion.

Another object of the invention is to provide a feed mechanism which has a continuously rotatable control member for positively positioning a record card or the like, and in which timing signals are generated in dependence upon the angular position of the control member.

The foregoing and other objects are accomplished in accordance with the invention by a mechanical gate, or a control member, located at the output side of the work station in the path of card travel, and rotatable about an axis transverse to the direction of card movement. The outer surface of the control member has a generally stepped, spiral-like shape in the form of "$n$" arcs of "$n$" different concentric circles, where "$n$" is the number of incremental steps through which it is desired to move the card. The common center of the concentric circles is coincident with the axis of rotation. Radii of the arced surfaces successively presented to a card decrease in extent as the control member rotates. Slip rollers or the like may be employed to urge the card against the surface of the control member. The control member serves the additional function of deflecting the record card from the work area after the last line of card information is punched or read.

Generally, the distances between the center lines of all adjacent lines (rows or columns) of information on a statistical record card are equal. In this case, the decrements between radii of successive arced surfaces of the control member also are equal. The decrement is made equal to the aforementioned distance between adjacent center lines when it is desired to feed the card in line-by-line steps. Of course, the radii also may be selected to control the card movement in other predetermined motion patterns. For example, the work station may be arranged to punch or read two lines simultaneously. In this event, the decrement between radii of adjacent arced surfaces is made equal to twice the distance between center lines of adjacent lines of card information. Also, the decrements in radii may be selected to feed a card or other member in a number of unequal steps if it is so desired or required in a particular application.

Although the invention has been described thus far as a record card feed control mechanism, and will be so described in detail hereinafter, it should be understood that this is the preferred use only and is in no way meant to constitute a limitation on the possible applications in which the invention may be employed. The invention also may be used in apparatus for feeding blanks, metal sheets and the like, by way of example.

In the accompanying drawing, like reference characters refer to like components, and:

Figure 1:
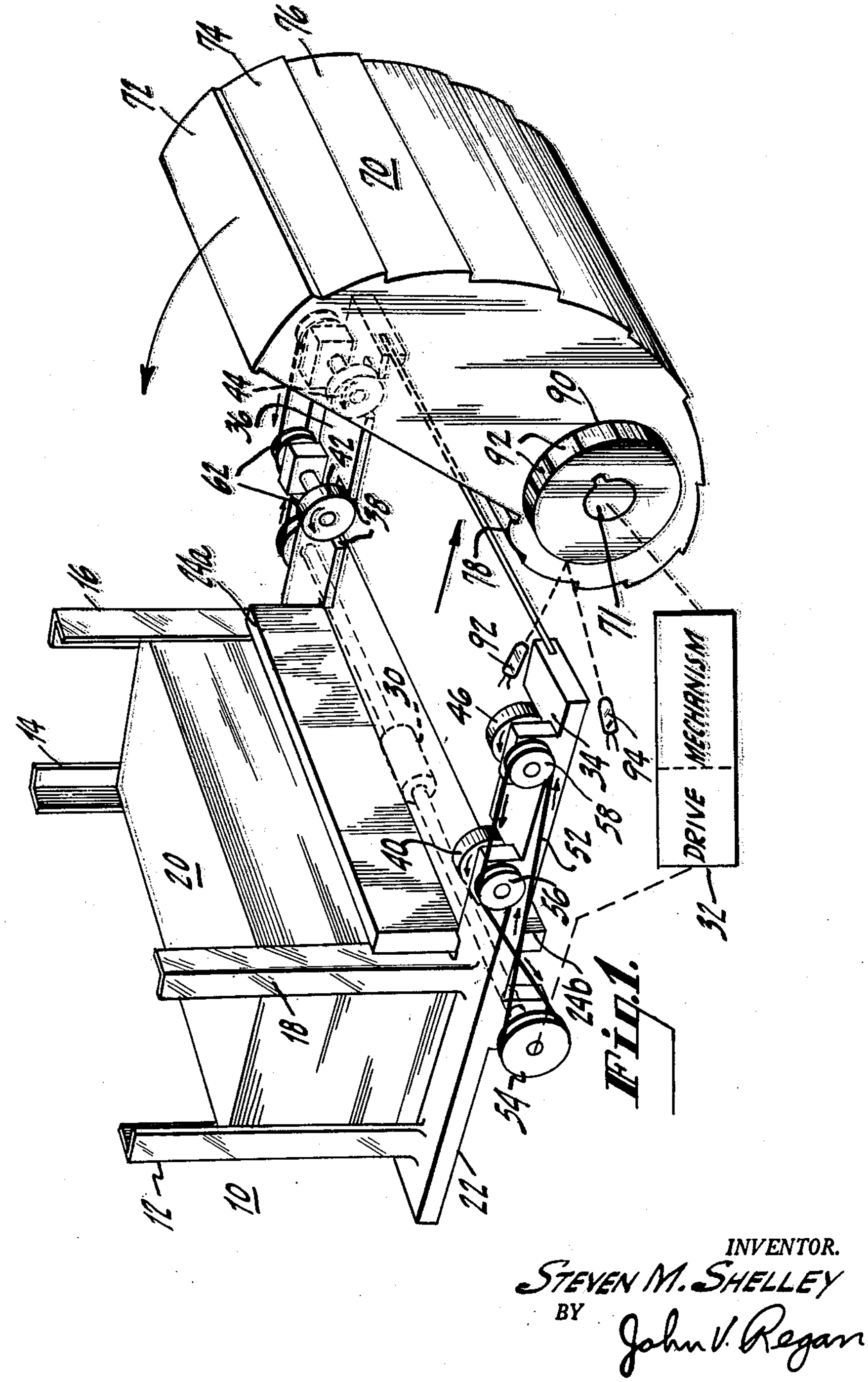
FIGURE 1 is a perspective view of the preferred form of the invention.

In FIGURE 1, a card input hopper 10 having rear vertical arms 12, 14 and forward vertical arms 16, 18 holds a stack of record cards 20. Input hopper 10 and the stack of cards 20 are supported on the top surface of a table 22. The record cards may be one of the standard Hollerith type cards, and each card may have, for example, twelve rows and eighty columns of data storage positions. In one such card in general use, center lines of adjacent rows are uniformly spaced 0.25 inch apart, and center lines of adjacent columns are uniformly spaced 0.087 inch apart. The cards are shown arranged in the input hopper 10 so as to be supplied to a work station *24a*, *24b* row-by-row, that is to say, in a direction parallel to the card columns.

Serial feeding of the cards from the bottom of input hopper 10 is accomplished by means of a friction type feed roller 30, positioned beneath table 22 at the forward end of the hopper 10, and driven from a drive mechanism 32. A slot is cut in the table 22 at the forward end of the hopper 10 to receive the roller 30. A throat 32 formed at the output side of the hopper 10 adjacent the table 22 assures that only one card is fed from the bottom of the stack at any one time.

The work station 24*a*, 24*b* is positioned closely adjacent the output side of the hopper 10 and receives the record card 26 being fed. The work station may be, for example, a card punch or card reader. In the case of a card punch, the upper section 24*a* of the work station may house a row of punches, there being one punch for each of the 80 columns of the card. These punches are aligned in a row transverse to the direction of card movement. The bottom section 24*b* of the work station houses a mating dieblock for the row of punches. In the case of a card reader, the upper section 24*a* of the work station may house a row of 80 aligned photo-pickup devices, and the bottom section 24*b* houses a light source.

The record card 26 emerging from the work station is guided by a pair of channeled guide rails 34, 36 having opposed channels along the length thereof for receiving the card. The top surfaces of the guide rails 34, 36 have cut-out portions 38 for receiving slip rollers 40–46. The slip rollers coact with the card 26 being fed and are rotatable in a direction to move the card in the direction indicated by the arrow. A belt 52 is driven by a pulley 54 mounted on the same shaft as the feed roller 30, and drives the slip rollers 40 and 46 by means of pulleys 56 and 58, respectively. A second belt 62 is driven from a pulley (not shown) at the opposite end of the feed roller 30 shaft and drives slip rollers 42 and 44 by means of pulleys.

In order to provide the desired step-by-step movement of the card through the work station 24*a*, 24*b*, there is provided a stepped, spiral-like gate or control member 70. Gate 70 is keyed to a shaft 71 and rotates about an axis which is transverse to the direction of card feed and which lies in the same plane as the card 26 being fed. Shaft 71 is driven from the same drive mechanism 32 as the feed roller 30, as indicated by the conventional dashed lines indicating mechanical coupling. The gate 70 is designed to block the path of the card in a manner to be described more fully hereinafter. Drive mechanism 32 may be, for example, a motor (not shown) having suitable drive ratios for feed roller 30 and shaft 71.

Figures 2, 3:
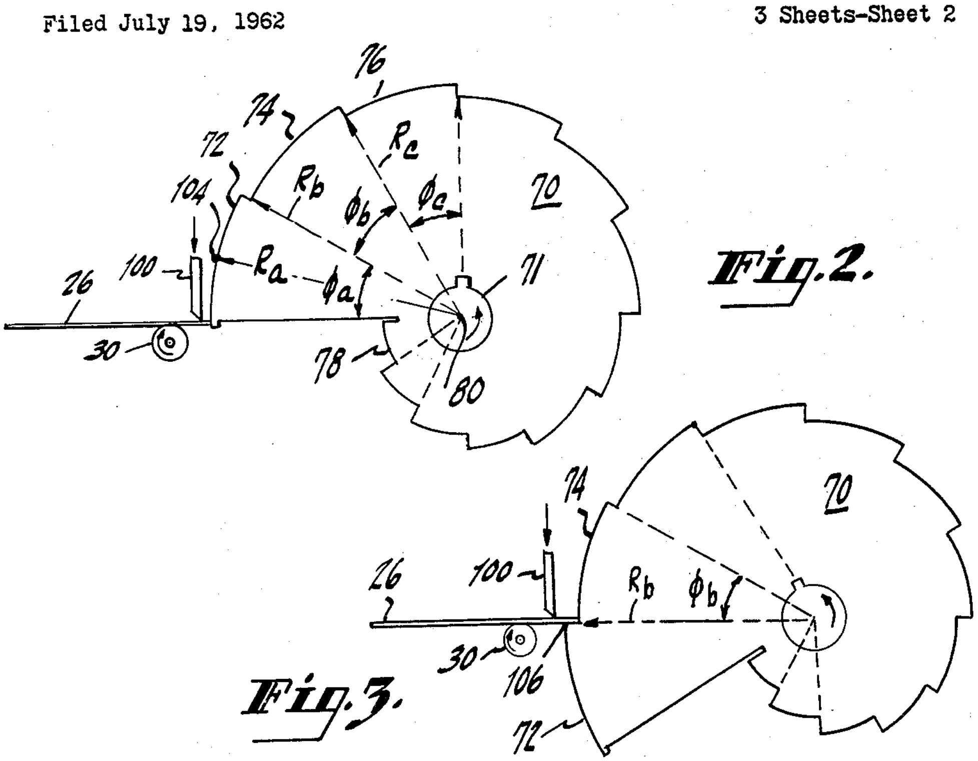
FIGURES 2 through 5 are views showing the gate in various angular positions, and useful in explaining the operation of the gate.

Details of the spiral-like gate 70 may best be understood from a consideration of FIGURE 2. The outer surface of the control member 70 has the form of "*n*" arced portions, 72–78, etc., where each portion is an arc of a different concentric circle, "*n*" being the number of steps, twelve in this example, through which it is desired to move the card. The common center 80 of the concentric circles is coincident with the axis of rotation of the gate 70. All of the arcs, for example arcs 72–76, subtend equal central angles, whereby the times required to rotate the gate 70 through the angles $\phi_a$–$\phi_c$ are equal. The radii of successive arcs decrease in extent from a maximum to a minimum in one revolution of the gate 70. When it is desired to move the card in equal steps, the radii of successive arcs differ in extent by an amount equal to the distance of each stepwise movement of the card 26. This distance is 0.25 inch for row-by-row feed of the Hollerith type card described previously. Accordingly, $R_a = R_b + 0.25 = R_c + 2(0.25)$, etc. for this type card.

The axial dimension of the gate 70 is less than the spacing between the guide rails 34 and 36, whereby the gate member 70 may be rotated through the space between the guide rails. Although the gate 70 is illustrated as having the form of one solid piece, it will be understood that, alternatively, several thinner, axially displaced gate members of like shape may be employed, provided that the total axial dimension of the combination is less than the spacing between the guide rails 34, 36. Gate 70 may be, for example, cast glass; alternatively, the gate 70 may be cast from a metal, or extruded, or it may be stamped and laminated.

All of the operations in the system, such as the operation of the punches, may be synchronized with the rotation of the gate 70, because the card 26 being fed always is positively positioned by the gate 70. This is a distinct advantage over many prior art systems, wherein the timing source operates independently of the card position control means, since in this system there is no possibility of loss of synchronism. A timing disk 90 is keyed to the shaft 71 and constrained to rotate with the gate 70. Timing disk 90 may have a number of polished flats 92 angularly displaced from one another around the periphery of the disk 90. Alternatively, the disk 90 may carry a number of mirrors on the periphery thereof, there being one mirror or flat for each of the arced portions 72–78, etc., of the gate 70. A light source 92 is mounted at the forward end of guide rail 34 and shines a beam of light on the periphery on the timing disk 90. The flats or mirrors 92 reflect the light beam to a phototube 94 or other photosensitive device. Accordingly, a timing pulse is generated each time a different one of the arced portions 72, etc. passes a point fixed in space. The timing disk 90 may be so arranged that a timing pulse is generated when the center of an arced portion passes a fixed point. The timing pulses may be used to control the operation of the card reader or punches in a manner illustrated in FIGURES 6 and 7, respectively, to be described.

Consider now the operation of the control gate 70. Gate 70 is shown in side view in various angular positions of rotation in FIGURES 2 through 5; only those other system components which best serve to illustrate the operation are shown therein. In FIGURE 2, control gate 70 has been rotated to a start position whereat the leading edge of the arced surface 72 of maximum radius interrupts the path of the card 26 being fed. Radius $R_a$ of arced surface 72 is selected so that the leading row of data storage positions of the card 26 is presented to the row of punches 100 when the gate 70 has the angular position illustrated. Card 26 remains stationary as the gate 70 rotates counterclockwise through the angle $\phi_a$. This follows from the fact that surface 72 is an arc of a circle whose center 80 coincides with the axis of revolution of the gate 70, and from the fact that the axis of rotation lies in the same plane as the card 26 being fed.

Timing disk 90 (FIGURE 1) may be arranged to generate a timing pulse after the disk 90 has rotated through an angle $\phi_a/2$ from the start position. Point 104 at the center of arced surface 72 then is in contact with the leading edge of the card 26. This timing pulse may be used, for example, to gate the information signals for actuating or otherwise controlling the selected punches 100.

FIGURE 3 illustrates the angular position of the gate 70 after the gate 70 has rotated through the angle $\phi_a$ from the start position. Card 26 is moved to the right (as viewed in the drawing) by feed roller 30, and comes to a stop position against arced surface 74 after the lagging edge 106 of surface 72 clears the card 26. The radius $R_b$ of arced surface 74 is 0.25 inch less than radius $R_a$, whereby card 26 is moved an amount equal to the distance between center lines of adjacent card rows. Data storage positions in the second row of card 26 now are presented to punches 100. Angle $\phi_a$ and angle $\phi_b$ preferably are made equal to each other and to all of the other central angles subtended by the remaining arced surfaces. Accordingly, the time required to rotate gate 70 through each central angle is the same, and all of the stationary or dwell periods of the card 26 are of equal duration. Timing disk 90 may generate a second timing pulse when the gate 70 has rotated through an angle $\phi_a + \phi_b/2$ from the start position.

Figure 4:
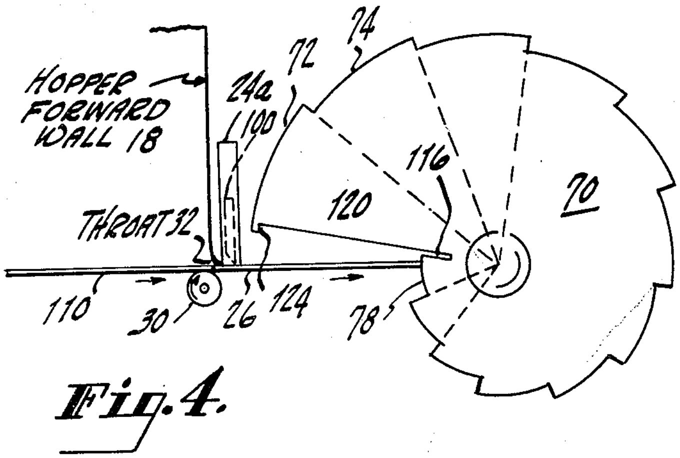

FIGURE 4 is illustrative of the gate 70 position after the card 26 has been moved through twelve incremental steps, and just prior to completion of a full revolution of gate 70 from the start position. The last row of data storage positions of card 26 is opposite the punches 100 at this time. Slip rollers 40–46 (FIGURE 1) urge the card 26 to the right. The rollers 40–46 slip, however, since the forward motion of card 26 is interrupted by the surface 78 of gate 70. Card 26 is held by, and essentially clamped in, the channeled guide rails 34, 36 to prevent the card 26 from being deflected out of the work area by the frictional force between the moving surface 78 and the leading edge of card 26 in contact therewith.

Note in FIGURE 4 that the trailing edge of card 26 has cleared the feed roller 30, and that the forward edge of the next card 110 is in contact with the feed roller 30. The throat 32 at the bottom of the forward hopper walls 16, 18 is dimensioned to prevent more than one card from leaving the hopper 10 at any one time. Accordingly, the second card 110 cannot leave the hopper when the first card 26 has the position illustrated in FIGURE 4. In general, the roller 30 is driven at a higher angular velocity than the gate 70, whereby the second card 110, once released from the hopper 10, moves rapidly to the right to the position shown in FIGURE 5.

Figure 5:
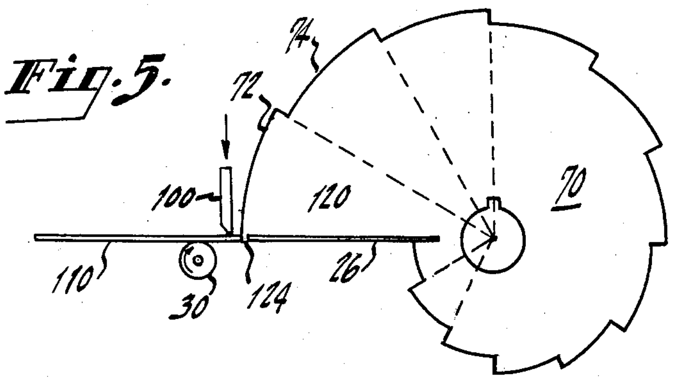

The gate 70 may have a radial slot 116 separating the first and last sectors 120 and 122 to receive the forward end of card 26 after the completion of the operating cycle. Slip rollers 40–46 shove the card 26 to the right and into slot 116 when the slot 116 is aligned with the card 26. Card 26 then assumes the position relative to the gate 70 as illustrated in FIGURE 5. The leading edge of large sector 120 has an overhang 124 which blocks the path of the second card 110, and prevents the second card 110 from being shoved into the radial slot 116. The leading row of data storage positions of card 110 now is positioned opposite the row of punches 100. Card 26 is deflected in a downward direction out of the work station area as control gate 70 rotates. Other means (not shown) may pick the card 26 from the gate 70 and transport the card 26 to an output hopper (not shown).

Record cards also may be fed in column-by-column fashion to a work station. In that event, it is necessary to feed a card in eighty incremental steps of 0.087 inch each, assuming that only one column is punched at a time, and assuming further that the cards are of the particular type described previously. The control gate for accomplishing this type of feed would have eighty arced surfaces, as compared to the twelve arced surfaces shown in FIGURES 1 through 5. Each arced surface would subtend a central angle of approximately $360° \div 80$, or 4.5°, and radii of successive arced surfaces would differ by 0.087 inch, the distance between center lines of adjacent columns of the card.

Figure 6:
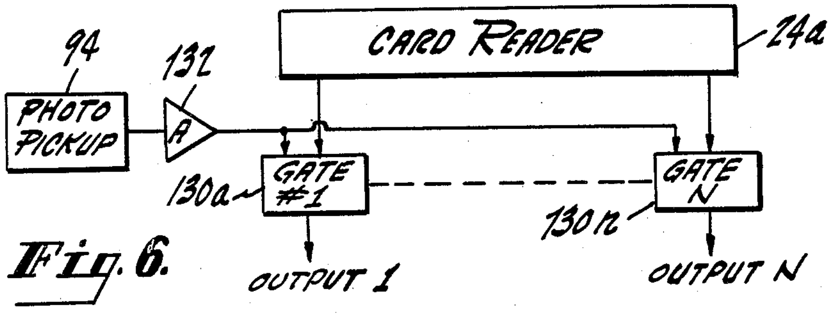
FIGURE 6 is a block diagram of a card reader timing system.

FIGURE 6 is a block diagram of a timing system for synchronizing the operation of the card reader with the rotation of the control gate 70. The card reader 24*a* at the work station may include, for example, twelve or eighty photosensitive devices, depending upon whether the card (not shown) is being fed column-by-column, or row-by-row, respectively, to the reader 24*a*. The individual outputs of the photosensitive devices are applied to separate, two input coincidence gates 130*a*–130*n*. In some cases, it may be desirable to amplify the reader outputs first. The timing pulse output of the photo-pickup device 94 (see also FIGURE 1) is amplified and applied to the second input of each of the coincidence gates 130*a*–130*n*. A gate provides a change in output only when its two inputs are energized simultaneously by the amplifier 132 output and the output of the corresponding photosensitive device in the reader 24*a*. Accordingly, the outputs of the reader are synchronized with the rotation of the gate 70 (FIGURE 1).

Figure 7:
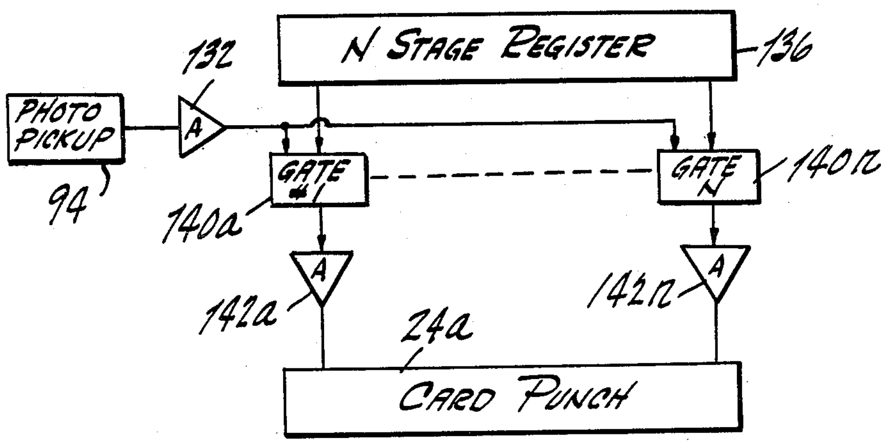
FIGURE 7 is a block diagram of a card punch timing system.

FIGURE 7 is a block diagram of a timing system for synchronizing the operation of the punches in the work station 24*a* with the rotation of the control gate 70. Information, to be punched in a line of the card (not shown) is stored in an "*n*" stage register 136 where "*n*" is the number of storage positions in a card line. The output of each register stage is fed to one input of a different two input coincidence gate 140*a*–140*n*. Amplifiers 142*a*–142*n* amplify the outputs of the coincidence gates 140*a*–140*n*, respectively, and the amplifier outputs energize the respective punch solenoids (not shown) in the work station 24*a*. The timing pulse output of the photo-pickup device 94 is amplified and applied to the second input of each of the coincidence gates 140*a*–140*n*. The output of a coincidence gate has the proper polarity and amplitude to energize a punch solenoid only when the two inputs to the gate are energized simultaneously by the outputs of the amplifier 132 and the associated stage in the register 136. Inasmuch as the timing pulses are synchronized with the control gate 70 rotation, it follows that the punches also operate in synchronism with the control gate 70.

What is claimed is:

1. Apparatus for controlling the movement of a record member in a number of incremental steps comprising: a stepped, spiral-shaped gate positioned in the path of movement of said member and rotatable in one direction only about an axis which is transverse to the leading edge of said member, the outer surface of said gate having a number of stepped portions located at different distances from said axis; and means continuously urging said record member in the direction of said gate.

2. Apparatus for controlling the movement of a record member in *n* incremental steps comprising: a gate positioned in the path of movement of said member and rotatable about an axis which is transverse to the path of movement of said member, the outer surface of said gate, in a plane transverse to said axis, having the form of *n* arcs, each of said arcs being located at a different distance from said axis and means for rotating said gate at constant speed in one direction only.

3. In a record member handling system, apparatus for controlling the movement of a record member in *n* incremental steps comprising: a gate positioned in the path of said member and rotatable about an axis which is transverse to the path of movement of said member, the outer surface of said gate having the form of *n* arcs of *n* different concentric circles, the centers of said circles being coincident with said axis, and the radii of successive arcs decreasing in extent in one angular direction; means for continuously urging said record member for movement in one direction only; and means for continuously rotating said gate in one angular direction at constant speed.

4. Apparatus for controlling the feed of a flat record member in *n* incremental steps along a straight path comprising: a control member rotatable at a constant speed in one direction only about an axis which is transverse to said path, the outer surface of said control member having the form of *n* arcs of *n* different concentric circles, the centers of which are coincident with said axis, the radii of successive arcs decreasing in extent in one angular direction, and means continuously urging said record member in one direction only along said path and against the surface of said control member.

5. Apparatus for controlling the feed of a record member in *n* incremental steps along a straight path comprising: a stepped spiral-like gate rotated at constant speed in one direction only about an axis which is transverse to said path, the stepped outer surface of said gate having the form of *n* arcs of *n* different concentric circles, the common center of which is coincident with said axis, said *n* arcs subtending equal central angles, and the radii of successive arcs decreasing in extent in one angular direction.

6. Apparatus for controlling the feed of a record card in *n* incremental steps of *x* inches each, comprising: a stepped spiral-like gate member rotatable about an axis which is transverse to the direction of card movement, the outer surface of said gate member having the form of *n* arcs of *n* different concentric circles, the common center of which is coincident with said axis, and the radii of successive arcs decreasing in extent by *x* inches in one angular direction and means for rotating said gate member at constant speed in the other angular direction only.

7. Apparatus for controlling the feed of a record card in $n$ incremental steps of $x$ inches each, comprising: a stepped spiral-like gate member rotatable in one direction only about an axis which is transverse to the direction of card movement, the outer surface gate member having the form of $n$ arcs of $n$ different concentric circles, the common center of which is coincident with said axis, said arcs subtending equal center angles, and the radii of successive arcs decreasing in extent by $x$ inches in one angular direction; and means continuously urging said record card in a direction against the surface of said gate member.

8. Apparatus for controlling the feed of a record card along a straight path in $n$ incremental steps of $x$ inches each comprising: a control member rotated at constant speed in one direction only about an axis which is transverse to said path and which lies in the same plane as said record card, the outer surface of said control member, in a plane transverse to said axis, having the form of $n$ minor arcs subtending equal center angles whose vertices are coincident with said axis, and the radii of successive arcs decreasing in extent by $x$ inches in one angular direction; and means continuously urging said record card along said path and against the surface of said control member.

9. Apparatus for controlling the feed of a record member through a work station in $n$ incremental steps per feed cycle comprising: a control member positioned on the output side of said work station and rotatable in one direction only about an axis which is transverse to the direction of card movement, the outer surface of said control member having the form of $n$ arcs of $n$ different concentric circles, the common center of which is coincident with said axis, and the radii of successive said arcs decreasing in extent in one angular direction; and means for feeding a card into the input side of said work station and for urging said card in one direction only against the surface of said control member.

10. Apparatus for controlling the feed of a record member through a work station in $n$ incremental steps per feed cycle comprising: a control member positioned on the output side of said work station and rotatable about an axis which is transverse to the direction of card movement, the outer surface of said control member having the form of $n$ arcs of $n$ different concentric circles, the common center of which is coincident with said axis, and the radii of successive said arcs decreasing in extent in one angular direction; means for feeding a card into the input side of said work station and against the surface of said control member; a timing disk constrained to rotate with said control member; and means for rotating said control member at constant speed in one angular direction only.

11. Apparatus for controlling the feed of a record member through a work station in $n$ incremental steps comprising: a control member positioned on the output side of said work station and rotatable about an axis which is transverse to the direction of card movement, the outer surface of said control member having the form of $n$ arcs of $n$ different concentric circles, the common center of which is coincident with said axis, and the radii of successive said arcs decreasing in extent in one angular direction; means for feeding a card into the input side of said work station and against the surface of said control member; a timing disk constrained to rotate with said control member; and means responsive to timing signals from said disk for supplying operating signals to said work station.

12. The combination comprising an input hopper for supporting a supply of record cards; a work station spaced apart from said input hopper; a pair of guide rails positioned at the output side of said work station, and having a pair of opposed channels for receiving a record card from said work station; a stepped, spiral-like gate member positioned on the output side of said work station and rotatable about an axis which is transverse to the direction of card movement, the outer surface of said gate member having the form of $n$ arcs of $n$ different concentric signals, the common center of which is coincident with said axis, and the radii of successive arcs decreasing in extent in one angular direction; slip roller means for moving a record card along said guide rails and against the surface of said gate member; and means for feeding record cards out of said input hopper in timed relation with the movement of a record card through said work station.

13. The combination comprising an input hopper for supporting a supply of record cards; a work station having an input side spaced apart from said input hopper; a pair of guide rails positioned at the output side of said work station, and having a pair of opposed channels for receiving a record card from the output of said work station; a stepped, spiral-like gate member positioned on the output side of said work station and rotatable about an axis which is transverse to the direction of card movement, the outer surface of said gate member having the form of $n$ arcs of $n$ different concentric circles, the common center of which is coincident with said axis, and the radii of successive arcs decreasing in extent in one angular direction; slip roller means for moving a record card along said guide rails and against the surface of said gate member; means for feeding record cards out of said input hopper in timed relation with the movement of a record card through said work station; a source of timing pulses operated in synchronism with the rotation of said gate member; and means responsive to timing signals from said source for supplying operating signals to said work station.

References Cited in the file of this patent

UNITED STATES PATENTS 2,123,978 Wagner ---------------- July 19, 1938